(12) United States Patent
Lin

(10) Patent No.: US 11,057,161 B2
(45) Date of Patent: Jul. 6, 2021

(54) WIRELESS COMMUNICATION METHOD AND APPARATUS IN WIRELESS COMMUNICATION DEVICE FOR TRANSMITTING FEEDBACK ACKNOWLEDGEMENT INFORMATION

(71) Applicant: GUANGDONG OPPO MOBILE TELECOMMUNICATIONS CORP., LTD., Dongguan (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/892,958

(22) Filed: Jun. 4, 2020

(65) Prior Publication Data
US 2020/0304243 A1 Sep. 24, 2020

Related U.S. Application Data

(63) Continuation of application No. PCT/CN2018/076896, filed on Feb. 14, 2018.

(51) Int. Cl.
*H04B 7/06* (2006.01)
*H04L 1/18* (2006.01)
(Continued)

(52) U.S. Cl.
CPC ......... *H04L 1/1812* (2013.01); *H04B 7/0623* (2013.01); *H04L 27/2646* (2013.01); *H04W 72/0413* (2013.01); *H04B 7/0621* (2013.01)

(58) Field of Classification Search
CPC ... H04J 11/0079; H04W 84/12; H04W 52/14; H04L 1/1861; H04L 5/0055; H04L 27/2646; H04B 7/0621; H04B 7/0623
See application file for complete search history.

(56) References Cited

U.S. PATENT DOCUMENTS

2009/0296609 A1 12/2009 Choi et al.
2019/0109692 A1* 4/2019 Gao .................... H04W 72/042

FOREIGN PATENT DOCUMENTS

CN 102208968 A 10/2011
CN 107294660 A 10/2017

OTHER PUBLICATIONS

R1-1719398, "Resource allocation for PUCCH HARQ-ACK feedback", Nov. 27-Dec. 5, 2017, pp. 1-5 (Year: 2017).*

(Continued)

*Primary Examiner* — Salvador E Rivas
(74) *Attorney, Agent, or Firm* — Morgan, Lewis & Bockius LLP

(57) ABSTRACT

Provided in an embodiment of the present invention are a radio communication method and device capable of preventing repeated transmission of feedback acknowledgement information and improving PUCCH efficiency. The method comprises: a terminal device transmitting first feedback information in a first time unit, wherein a bit in the first feedback information corresponding to a first resource unit is set to be placeholder information, the first resource unit belongs to a first target resource set, the first resource unit is used to transmit a first downlink channel, a feedback time sequence corresponding to the first downlink channel is a second time unit, the first target resource set comprises at least one resource unit, and the second time unit is different from the first time unit.

22 Claims, 4 Drawing Sheets

(51) Int. Cl.
*H04W 72/04* (2009.01)
*H04L 27/26* (2006.01)

(56) References Cited

OTHER PUBLICATIONS

Guangdong OPPO Mobile Telecommunications Corp. Ltd., International Search Report and Written Opinion, PCT/CN2018/076896, Oct. 17, 2018, 9 pgs.
LG Electronics, "HARQ Process and HARQ-ACK Feedback for NR," 3GPP TSG RAN WG1 Meeting #91 R1-1719930, Nov. 27-Dec. 1, 2017, 17 pgs.
Samsung, "HARQ Management and Feedback," 3GPP TSG RAN WG1 Meeting #91 R1-1720340, Nov. 27-Dec. 1, 2017, 8 pgs.
Ericsson, Partial overlapping of PUCCH resources, 3GPP TSG RAN WG1 Meeting #92, R1-1803531, Athens, Greece, Feb. 26-Mar. 2, 2018, Agenda Item: 7.1.3.2.1, 24 pgs.
Samsung, Summary on CA Aspects, 3GPP TSG RAN WG1 NR AH1801, R1-1801088, Vancouver, Canada, Jan. 22-26, 2018, Agenda Item 7.3.4.2, 8 pgs.
Guangdong Oppo Mobile Telecommunications Corp. Ltd., Extended European Search Report, EP18906692-1, dated Jan. 20, 2021, 7 pgs.
Oppo, "Discussion on HARQ-ACK transmission," 3GPP TSG RAN WG1 Meeting #91, R1-1719993, Reno, USA, Nov. 27-Dec. 1, 2017, 6 pgs.

* cited by examiner

WIRELESS COMMUNICATION METHOD AND APPARATUS IN WIRELESS COMMUNICATION DEVICE FOR TRANSMITTING FEEDBACK ACKNOWLEDGEMENT INFORMATION

CROSS-REFERENCE TO RELATED APPLICATION

This application is a continuation application of PCT Application No. PCT/CN2018/076896, filed Feb. 14, 2018, the entire contents of which are incorporated herein by reference.

TECHNICAL FIELD

The present application relates to the field of communication, and more particularly, to a wireless communication method, a terminal device and a network device.

BACKGROUND

In the long term evolution (LTE) system, after receiving a downlink channel (e.g., a physical downlink shared channel (PDSCH)), the terminal may send feedback response information corresponding to the downlink channel.

In the new radio (NR) system, how to transmit the feedback information of the downlink channel is an urgent problem to be solved.

SUMMARY

Embodiments of the present application provide a wireless communication method and device, which are able to avoid repeated transmission of feedback response information, so as to improve the efficiency of physical uplink control channel (PUCCH).

According to a first aspect, there is provided a wireless communication method, including:

sending, by a terminal device, first feedback information on a first time unit;

wherein a bit, corresponding to a first resource unit, in the first feedback information is provided as placeholder information, the first resource unit belongs to a first target resource set, the first resource unit is used for transmitting a first downlink channel, a feedback timing corresponding to the first downlink channel is a second time unit, the first target resource set includes at least one resource unit, and the second time unit is different from the first time unit.

In combination with the first aspect, according to a possible implementation of the first aspect, the first target resource set is determined according to a high-level parameter.

In combination with the first aspect or any possible implementation thereof as described above, according to another possible implementation of the first aspect, each resource unit in the first target resource set is able to be configured for transmitting the downlink channel.

In combination with the first aspect or any possible implementation thereof as described above, according to another possible implementation of the first aspect, the first target resource set includes at least one time unit within at least one carrier.

In combination with the first aspect or any possible implementation thereof as described above, according to another possible implementation of the first aspect, a number of bits of the first feedback information is determined based on a number of resource units in the first target resource set.

In combination with the first aspect or any possible implementation thereof as described above, according to another possible implementation of the first aspect, each resource unit in the first target resource set corresponds to at least one bit in the first feedback information.

In combination with the first aspect or any possible implementation thereof as described above, according to another possible implementation of the first aspect, a bit, corresponding to a second resource unit, in the first feedback information is used for carrying feedback response information of a second downlink channel, and wherein the second resource unit belongs to the first target resource set, the second resource unit is used for transmitting the second downlink channel, and a feedback timing corresponding to the second downlink channel is the first time unit.

In combination with the first aspect or any possible implementation thereof as described above, according to another possible implementation of the first aspect, the first resource unit further belongs to a second target resource set, the second target resource set includes at least one resource unit, and the method further includes:

sending, by the terminal device, second feedback information on the second time unit;

wherein a bit, corresponding to the first resource unit, in the second feedback information is provided as feedback response information of the first downlink channel.

In combination with the first aspect or any possible implementation thereof as described above, according to another possible implementation of the first aspect, each resource unit in the second target resource set corresponds to at least one bit in the second feedback information.

In combination with the first aspect or any possible implementation thereof as described above, according to another possible implementation of the first aspect, the method further includes:

receiving, by the terminal device, indication information sent by a network device, wherein the indication information is used for indicating that the feedback timing corresponding to the first downlink channel is the second time unit.

According to a second aspect, there is provided a wireless communication method, including:

receiving, by a network device on a first time unit, first feedback information sent by a terminal device;

wherein a bit, corresponding to a first resource unit, in the first feedback information is provided as placeholder information, the first resource unit belongs to a first target resource set, the first resource unit is used for transmitting a first downlink channel, a feedback timing corresponding to the first downlink channel is a second time unit, the first target resource set includes at least one resource unit, and the second time unit is different from the first time unit.

In combination with the second aspect, according to a possible implementation of the second aspect, the method further includes:

providing, by the network device to the terminal device, a high-level parameter used for determining the first target resource set.

In combination with the second aspect or any possible implementation thereof as described above, according to another possible implementation of the second aspect, each resource unit in the first target resource set is able to be configured for transmitting the downlink channel.

In combination with the second aspect or any possible implementation thereof as described above, according to another possible implementation of the second aspect, the first target resource set includes at least one time unit within at least one carrier.

In combination with the second aspect or any possible implementation thereof as described above, according to another possible implementation of the second aspect, a number of bits of the first feedback information is determined based on a number of resource units in the first target resource set.

In combination with the second aspect or any possible implementation thereof as described above, according to another possible implementation of the second aspect, each resource unit in the first target resource set corresponds to at least one bit in the first feedback information.

In combination with the second aspect or any possible implementation thereof as described above, according to another possible implementation of the second aspect, a bit, corresponding to a second resource unit, in the first feedback information is used for carrying feedback response information of a second downlink channel, and wherein the second resource unit belongs to the first target resource set, the second resource unit is used for transmitting the second downlink channel, and a feedback timing corresponding to the second downlink channel is the first time unit.

In combination with the second aspect or any possible implementation thereof as described above, according to another possible implementation of the second aspect, the first resource unit further belongs to a second target resource set, the second target resource set includes at least one resource unit, and the method further includes:

receiving, by the network device, second feedback information on the second time unit;

wherein a bit, corresponding to the first resource unit, in the second feedback information is provided as feedback response information of the first downlink channel.

In combination with the second aspect or any possible implementation thereof as described above, according to another possible implementation of the second aspect, each resource unit in the second target resource set corresponds to at least one bit in the second feedback information.

In combination with the second aspect or any possible implementation thereof as described above, according to another possible implementation of the second aspect, the method further includes:

sending, by the network device, indication information, wherein the indication information is used for indicating that the feedback timing corresponding to the first downlink channel is the second time unit.

According to a third aspect, there is provided a terminal device, configured to perform the method according to the first aspect or any possible implementation thereof as described above. Specifically, the terminal device includes a functional module configured to perform the method according to the first aspect or any possible implementation thereof as described above.

According to a fourth aspect, there is provided a network device, configured to perform the method according to the second aspect or any possible implementation thereof as described above. Specifically, the network device includes a functional module configured to perform the method according to the second aspect or any possible implementation thereof as described above.

According to a fifth aspect, there is provided a terminal device, including a processor, a memory and a transceiver. The processor, the memory, and the transceiver communicate with each other through an internal connection path, and transfer control and/or data signal, causing the terminal device to perform the method according to the first aspect or any possible implementation thereof as described above.

According to a sixth aspect, there is provided a network device, including a processor, a memory and a transceiver. The processor, the memory, and the transceiver communicate with each other through an internal connection path, and transfer control and/or data signal, causing the network device to perform the method according to the second aspect or any possible implementation thereof as described above.

According to a seventh aspect, there is provided a computer-readable medium, configured to store a computer program, the computer program includes instructions for performing the method or any possible implementation thereof as described above.

According to an eighth aspect, there is provided a computer program product including instructions, which when executed on a computer, causes the computer to perform the method or any possible implementation thereof as described above.

Therefore, according to one or more embodiments of the present application, when the feedback response information corresponding to the downlink channel of a resource unit can be carried in multiple time units, placeholder information is provided for the resource unit in the feedback information sent on one of the time units. Repeated transmission of feedback response information can be avoided, thereby improving the efficiency of the physical uplink control channel (PUCCH).

BRIEF DESCRIPTION OF THE DRAWINGS

In order to more clearly illustrate the technical solutions of the embodiments of the present application, the drawings used in the embodiments or the description of the prior art will be briefly introduced below. Obviously, the drawings in the following description are merely some examples of the application. For those of ordinary skill in the art, other embodiments may be obtained based on these drawings without creative labor.

DETAILED DESCRIPTION

The technical solutions in the embodiments of the present application will be described below with reference to the drawings in the embodiments of the present application. Obviously, the described embodiments are part of the embodiments of the present application, but not all of the embodiments. Based on the embodiments in the present application, all other embodiments obtained by a person of ordinary skill in the art without creative efforts shall fall within the protection scope of the present application.

The technical solutions of the embodiments of the present application can be applied to various communication systems, for example, Global System of Mobile communication (GSM) system, Code Division Multiple Access (CDMA) System, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or future 5G systems (also known as New Radio (NR) systems).

Figure 1:
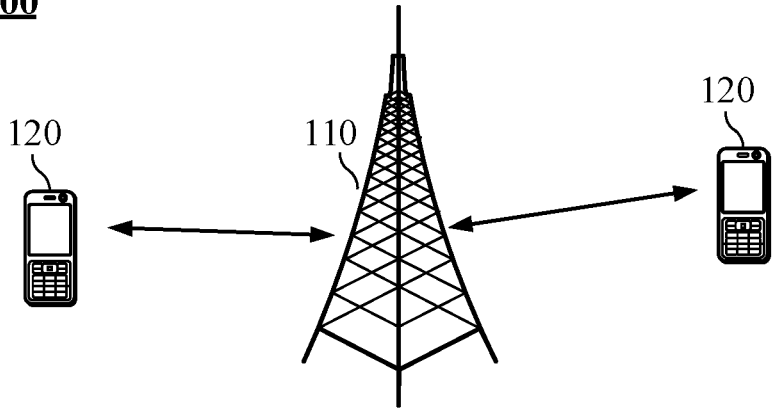
FIG. 1 is a schematic diagram of a wireless communication system according to an embodiment of the present application.

FIG. 1 illustrates a wireless communication system 100 applied in an embodiment of the present application. The wireless communication system 100 may include a network device 110. The network device 100 may be a device that communicates with a terminal device. The network device 100 may provide communication coverage for a specific geographic area, and may communicate with a terminal device (such as a UE) located within the coverage area. Optionally, the network device 100 may be a Base Transceiver Station (BTS) in GSM system or CDMA system, a NodeB (NB) in WCDMA system, an Evolutional Node B (eNB or eNodeB) in LTE system, or a wireless controller in Cloud Radio Access Network (CRAN), or the network device may be a relay station, an access point, an in-vehicle device, a wearable device, a network side equipment in the future 5G network or a network device in the future evolved Public Land Mobile Network (PLMN).

The wireless communication system 100 further includes at least one terminal device 120 located within a coverage area of the network device 110. The terminal device 120 may be mobile or fixed. Optionally, the terminal device 120 may refer to access terminal, user equipment (UE), user unit, user station, mobile site, mobile station, remote station, remote terminal, mobile device, user terminal, terminal, wireless communication device, user agent, or user device. The access terminal may be a cell phone, a cordless phone, a Session Initiation Protocol (SIP) phone, a Wireless Local Loop (WLL) station, a Personal Digital Assistant (PDA), a handheld device or a computing device with wireless communication function, a processing device, an in-vehicle device or a wearable device connected to a wireless modem, a terminal device in future 5G networks, or a terminal device in future evolved PLMN.

Optionally, the terminal devices 120 may perform device-to-device (D2D) communication therebetween.

Optionally, the 5G system or network may also be referred to as a new radio (New Radio, NR) system or network.

FIG. 1 exemplarily illustrates one network device and two terminal devices. Optionally, the wireless communication system 100 may include multiple network devices and the coverage range of each network device may include other numbers of terminal devices. Embodiments of the application are not limited thereto.

Optionally, the wireless communication system 100 may further include other network entities such as a network controller, a mobility management entity, and the like. Embodiments of the application are not limited thereto.

It should be understood that the terms "system" and "network" are often used interchangeably herein. The term "and or" in this document is only a kind of association relationship describing related objects, which means that there may be three kinds of relationships, for example, A and/or B may refer to three examples: A exists alone, both A and B exist, and B exists alone. In addition, the sign "/" in this document generally indicates that an "or" relationship exists between related objects.

Figure 2:
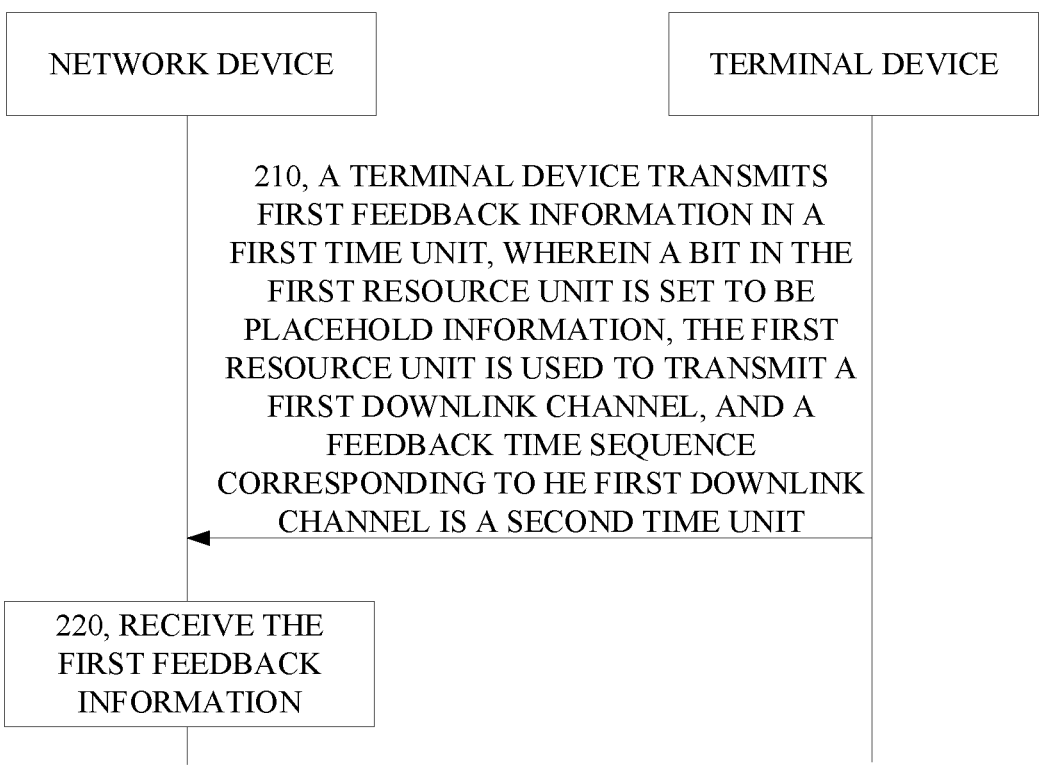
FIG. 2 is a schematic flowchart of a wireless communication method according to an embodiment of the present application.

FIG. 2 is a schematic flowchart of a wireless communication method 200 according to an embodiment of the present application. The method 200 may be optionally applied to the system shown in FIG. 1, but is not limited thereto. As shown in FIG. 2, the method 200 includes at least part of the following contents.

In 210, the terminal device sends first feedback information on a first time unit.

A bit, corresponding to a first resource unit, in the first feedback information is provided as placeholder information, the first resource unit belongs to a first target resource set, the first resource unit is used for transmitting a first downlink channel, a feedback timing corresponding to the first downlink channel is a second time unit, the first target resource set includes at least one resource unit, and the second time unit is different from the first time unit.

In 220, the network device receives, on the first time unit, the first feedback information sent by the terminal device.

Optionally, the first time unit or the second time unit may be a time slot, a mini time slot, a symbol, or the like.

Optionally, the placeholder information in this embodiment of the present application may be NACK information.

Optionally, the feedback response information in this embodiment of the present application may be ACK information or NACK information, and may specifically be determined according to a result of the downlink channel.

Optionally, the size of the resources occupied in the time domain by the resource units in the first target resource set may be the same.

Optionally, each resource unit in the first target resource set may occupy, in the time domain, one or more time slots, or one or more symbols within one time slot.

Optionally, the first target resource set includes at least one time unit within at least one carrier.

Optionally, the first target resource set may transmit multiple downlink channels, and each downlink channel may occupy at least one resource unit. The number of resource units occupied by the multiple downlink channels may be different.

If the first target resource set transmits multiple downlink channels, the first feedback information may carry feedback information of the multiple downlink channels.

Optionally, the NR system supports ACK/NACK multiplexed transmission, that is, ACK/NACK information corresponding to multiple PDSCHs is transmitted through one PUCCH. For ACK/NACK multiplexed transmission, it further supports two manners for generating ACK/NACK information generation: semi-static determination of the number of ACK/NACK bits (semi-static HARQ-ACK codebook); and dynamic determination of the number of ACK/NACK bits (dynamic HARQ-ACK codebook). When it is configured to determine the number of ACK/NACK bits semi-statically, the terminal determines the number of ACK/NACK bits according to the maximum and minimum values in its supported pre-configured set. For example, in the case of single carrier and single codeword transmission, the pre-configured set is {1, 2, 3, 4, 5, 6, 7, 8}, and the number of ACK/NACK bits is 8 bits.

Optionally, the first target resource set is determined according to a high-level parameter.

Specifically, the network device may configure the first target resource set to the terminal through the high-level parameter, such that the terminal may determine the first target resource set according to the high-level parameter.

Optionally, each resource unit in the first target resource set may be configured to transmit the downlink channel.

It should be understood that, even each resource unit may be configured to transmit the downlink channel, it does not mean that the resource set has to transmit the downlink channel, but only indicates that the resource unit supports transmission of the downlink channel.

Optionally, in an embodiment of the present application, when a resource unit transmits a downlink channel, one or more coding blocks may be transmitted in one resource unit, or one or more transmission blocks may be transmitted in one resource unit.

Optionally, before sending the first feedback information on the first time unit, the terminal device determines the number of bits of the first feedback information.

Optionally, the number of bits of the first feedback information is related to the number of resource units in the first target resource set, that is, the number of bits of the first feedback information is determined based on the number of resource units in the first target resource set.

Optionally, each resource unit in the first target resource set corresponds to at least one bit in the first feedback information.

Optionally, the number of bits corresponding to the resource unit in the first feedback information may be related to the number of coding block groups or transmission blocks that each resource unit can carry.

For example, the number of bits corresponding to one resource unit in the first feedback information may be equal to the number of coding block groups or transmission blocks that the resource unit can carry.

Optionally, when there is no downlink channel transmitted on a resource unit, at least one bit corresponding to the resource unit may carry placeholder information.

Optionally, in an embodiment of the present application, a bit, corresponding to a second resource unit, in the first feedback information is used for carrying feedback response information of a second downlink channel, and the second resource unit belongs to the first target resource set, the second resource unit is used for transmitting the second downlink channel, and a feedback timing corresponding to the second downlink channel is the first time unit.

Optionally, in an embodiment of the present application, the first resource unit also belongs to a second target resource set. The second target resource set includes at least one resource unit, and the terminal device sends second feedback information on the second time unit.

Herein, a bit, corresponding to the first resource unit, in the second feedback information may be provided as feedback response information of the first downlink channel.

Optionally, the size of the resources occupied in the time domain by the resource units in the second target resource set may be the same.

Optionally, each resource unit in the second target resource set may occupy, in the time domain, one or more time slots or, one or more symbols within one time slot.

Optionally, the second target resource set includes at least one time unit within at least one carrier.

Optionally, the number of bits of the second feedback information is related to the number of resource units in the second target resource set, that is, the number of bits of the second feedback information is determined based on the number of resource units in the second target resource set.

Optionally, each resource unit in the second target resource set corresponds to at least one bit in the second feedback information.

Optionally, the number of bits corresponding to the resource unit in the second feedback information may be related to the number of coding block groups or transmission blocks that each resource unit can carry.

For example, the number of bits corresponding to one resource unit in the second feedback information may be equal to the number of coding block groups or transmission blocks that the resource unit can carry.

Optionally, when there is no downlink channel transmitted on a resource unit, at least one bit corresponding to the resource unit may carry placeholder information.

Optionally, the second target resource set may transmit multiple downlink channels, and each downlink channel may occupy at least one resource unit. The number of resource units occupied by the multiple downlink channels may be different.

Optionally, the number of resource units included in the first target resource set and the second target resource set may be the same, or may be different.

Optionally, the size of the resource unit included in the first target resource set and the size of the resource unit included in the second target resource set may be the same, or may be different.

Optionally, in an embodiment of the present application, the terminal receives indication information sent by the network device. The indication information is used for indicating that a feedback timing corresponding to the first downlink channel is the second time unit.

Optionally, in 5G (NR, new radio) system, the PDSCH supports dynamically indicating feedback timing of feedback response information (Hybrid Automatic Repeat reQuest (HARD) timing). That is, the terminal determines a pre-configured timing set, which may include 8 values, for example, {K10, K11, K12, K13, K14, K15, K16, K17}. Downlink Control Information (DCI) indicates that the PDSCH is transmitted in slot n, and the DCI includes a 3-bit target information field for indicating a value K1i in the timing set. Then the terminal sends, in slot n+K1i, Acknowledge (ACK)/Non-Acknowledge (NACK) information corresponding to the PDSCH.

In order to understand the present application more clearly, an example will be described below with reference to FIG. 3.

Figure 3:
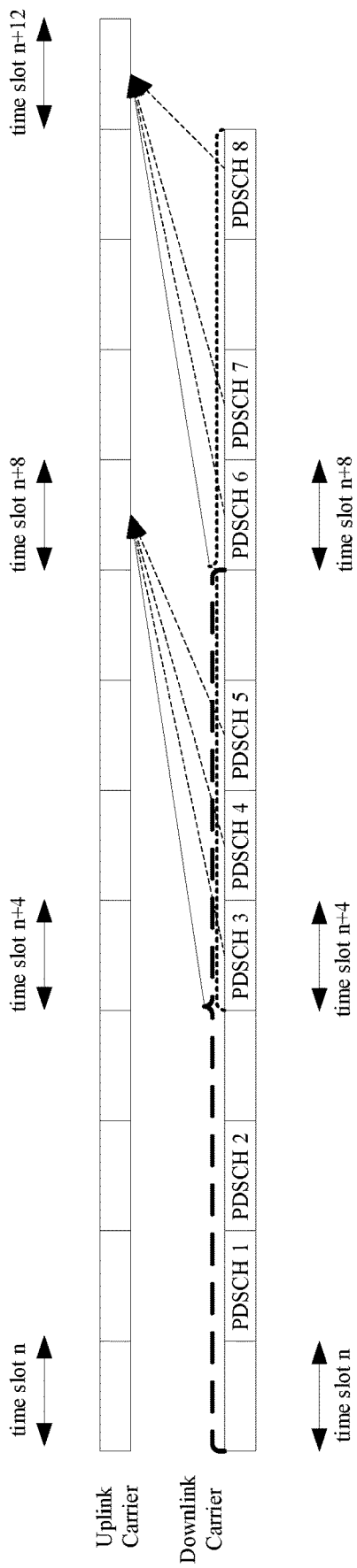
FIG. 3 illustrates a mapping relationship between a resource unit and a time unit for sending feedback information according to an embodiment of the present application.

As shown in FIG. 3, PDSCH1, PDSCH2, PDSCH3, PDSCH4, PDSCH5, PDSCH6, PDSCH7 and PDSCH8 are transmitted in time slots n+1, n+2, n+4, n+5, n+6, n+8, n+9 and n+11, respectively.

Among them, time slot n+8 corresponds to time slot n to time slot n+7, that is, feedback information is transmitted on time slot n+8, and the feedback information may be used for carrying feedback response information of the downlink channels on time slot n to time slot n+7. In addition, time slot n+12 corresponds to time slot n+4 to time slot n+11, that is, feedback information is transmitted on time slot n+12, and the feedback information may be used for carrying feedback response information of the downlink channels on time slot n+4 to time slot n+11.

As can be seen from the above, for time slot n+4 to time slot n+7, the feedback response information of the downlink channels transmitted thereon may be carried on time slot n+8 or on time slot n+12.

The network device may indicate feedback timing that, for example, ACK/NACK of PDSCH 1, 2, 3, 4, 5 is transmitted in time slot n+8, while ACK/NACK of PDSCH 6, 7, 8 is transmitted in time slot n+12.

Then the terminal device may determine that the feedback information sequence in time slot n+8 is {0, b1, b2, 0, b3, b4, b5, 0}, and the feedback information sequence in time slot n+12 is {0, 0, 0, 0, b6, b7, 0, b8}, where bi is the ACK/NACK information corresponding to PDSCHi, and "0" is placeholder information.

In an embodiment of the present application, the first feedback information transmitted in the first time unit includes at least one feedback response information corresponding to at least one downlink channel, the at least one downlink channel is transmitted through a resource unit in the first target resource set, and the feedback timing corresponding to the at least one downlink channel is the first time unit.

Furthermore, each resource unit in the first target resource set corresponds to at least one bit in the first feedback information, then the bit of the feedback response information of the at least one downlink channel in the feedback information is the bit corresponding to the resource unit for transmitting the downlink channel.

Optionally, when there is a resource unit in the first target resource set that does not transmit a downlink channel, a bit corresponding to the resource unit that does not transmit a downlink channel may be provided as placeholder information.

Optionally, when the feedback timing corresponding to the downlink channel transmitted by a resource unit in the first target resource set is not the first time unit, the bit corresponding to the resource unit may be also provided as placeholder information.

Therefore, according to one or more embodiments of the present application, when the feedback response information corresponding to the downlink channel of a resource unit can be carried in multiple time units, placeholder information is provided for the resource unit in the feedback information sent on one of the time units. Repeated transmission of feedback response information can be avoided, thereby improving the efficiency of the physical uplink control channel (PUCCH).

Figure 4:
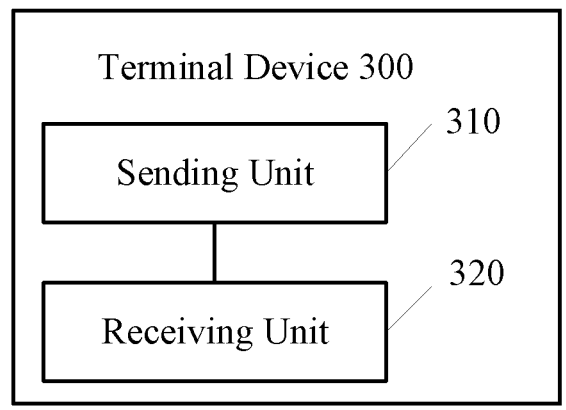
FIG. 4 is a block diagram of a terminal device according to an embodiment of the present application.

FIG. 4 is a block diagram of a terminal device 300 according to an embodiment of the present application. As shown in FIG. 4, the terminal device 300 includes a sending unit 310 configured to:

send first feedback information on a first time unit;

wherein a bit, corresponding to a first resource unit, in the first feedback information is provided as placeholder information, the first resource unit belongs to a first target resource set, the first resource unit is used for transmitting a first downlink channel, a feedback timing corresponding to the first downlink channel is a second time unit, the first target resource set includes at least one resource unit, and the second time unit is different from the first time unit.

Optionally, the first target resource set is determined according to a high-level parameter.

Optionally, each resource unit in the first target resource set is able to be configured for transmitting the downlink channel.

Optionally, the first target resource set includes at least one time unit within at least one carrier.

Optionally, a number of bits of the first feedback information is determined based on a number of resource units in the first target resource set.

Optionally, each resource unit in the first target resource set corresponds to at least one bit in the first feedback information.

Optionally, a bit, corresponding to a second resource unit, in the first feedback information is used for carrying feedback response information of a second downlink channel, and wherein the second resource unit belongs to the first target resource set, the second resource unit is used for transmitting the second downlink channel, and a feedback timing corresponding to the second downlink channel is the first time unit.

Optionally, the first resource unit further belongs to a second target resource set, the second target resource set includes at least one resource unit, and the sending unit 310 is further configured to:

send second feedback information on the second time unit;

wherein a bit, corresponding to the first resource unit, in the second feedback information is provided as feedback response information of the first downlink channel.

Optionally, each resource unit in the second target resource set corresponds to at least one bit in the second feedback information.

Optionally, as shown in FIG. 4, the terminal device 300 further includes a receiving unit 320 configured to:

receive indication information sent by a network device, wherein the indication information is used for indicating that the feedback timing corresponding to the first downlink channel is the second time unit.

It should be understood that the terminal device 300 may correspond to the terminal device in the method 200, and can perform corresponding operations of the terminal device in the method 200. For brevity, details are not repeated herein.

Figure 5:
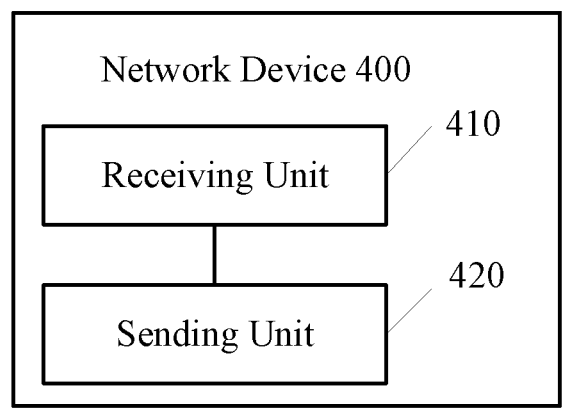
FIG. 5 is a block diagram of a network device according to an embodiment of the present application.

FIG. 5 is a block diagram of a network device 400 according to an embodiment of the present application. As shown in FIG. 5, the network device 400 includes a receiving unit 410 configured to:

receive, on a first time unit, first feedback information sent by a terminal device;

wherein a bit, corresponding to a first resource unit, in the first feedback information is provided as placeholder information, the first resource unit belongs to a first target resource set, the first resource unit is used for transmitting a first downlink channel, a feedback timing corresponding to the first downlink channel is a second time unit, the first target resource set includes at least one resource unit, and the second time unit is different from the first time unit.

Optionally, as shown in FIG. 5, the network device 40 further includes a sending unit 420 configured to:

provide, to the terminal device, a high-level parameter used for determining the first target resource set.

Optionally, each resource unit in the first target resource set is able to be configured for transmitting the downlink channel.

Optionally, the first target resource set includes at least one time unit within at least one carrier.

Optionally, a number of bits of the first feedback information is determined based on a number of resource units in the first target resource set.

Optionally, each resource unit in the first target resource set corresponds to at least one bit in the first feedback information.

Optionally, a bit, corresponding to a second resource unit, in the first feedback information is used for carrying feedback response information of a second downlink channel, and wherein the second resource unit belongs to the first target resource set, the second resource unit is used for transmitting the second downlink channel, and a feedback timing corresponding to the second downlink channel is the first time unit.

Optionally, the first resource unit further belongs to a second target resource set, the second target resource set includes at least one resource unit, and the receiving unit 410 is further configured to:

receive second feedback information on the second time unit;

wherein a bit, corresponding to the first resource unit, in the second feedback information is provided as feedback response information of the first downlink channel.

Optionally, each resource unit in the second target resource set corresponds to at least one bit in the second feedback information.

Optionally, as shown in FIG. 5, the network device 40 further includes a sending unit 420 configured to:

send indication information, wherein the indication information is used for indicating that the feedback timing corresponding to the first downlink channel is the second time unit.

It should be understood that the network device 400 may correspond to the network device in the method 200, and can perform corresponding operations of the network device in the method 200. For brevity, details are not repeated herein.

Figure 6:
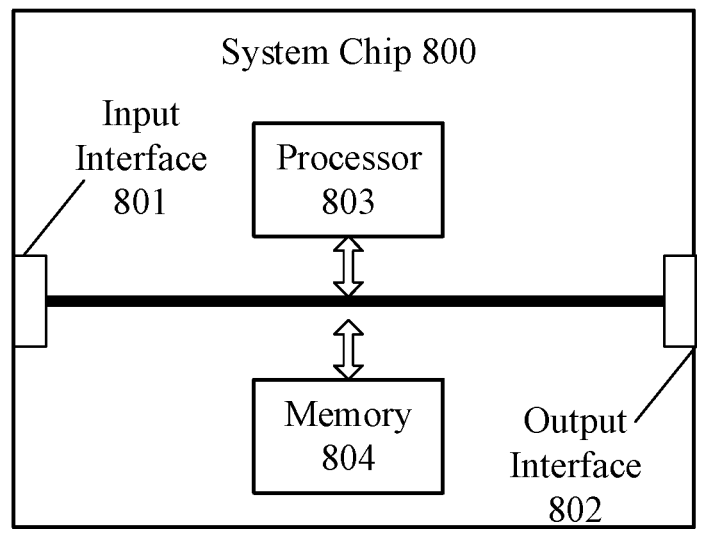
FIG. 6 is a block diagram of a system chip according to an embodiment of the present application.

FIG. 6 is a block diagram of a system chip 800 according to an embodiment of the present application. The system chip 800 in FIG. 6 includes an input interface 801, an output interface 802, a processor 803 and a memory 804 that may be connected through an internal communication connection line. The processor 803 is configured to execute codes in the memory 804.

Optionally, when the codes are executed, the processor 803 implements the method executed by the network device in the method embodiment. For brevity, details are not repeated herein.

Optionally, when the codes are executed, the processor 803 implements the method executed by the terminal device in the method embodiment. For brevity, details are not repeated herein.

Figure 7:
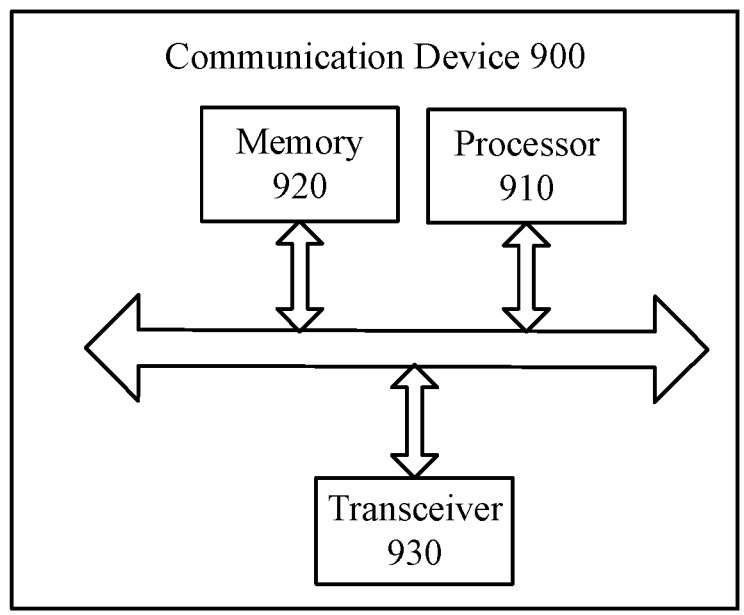
FIG. 7 is a block diagram of a communication device according to an embodiment of the present application.

FIG. 7 is a block diagram of a communication device 900 according to an embodiment of the present application. As shown in FIG. 7, the communication device 900 includes a processor 910 and a memory 920. The memory 920 may store program codes, and the processor 910 may execute the program codes stored in the memory 920.

Optionally, as shown in FIG. 7, the communication device 900 may include a transceiver 930, and the processor 910 may control the transceiver 930 to communicate externally.

Optionally, the processor 910 may invoke the program codes stored in the memory 920 to perform the corresponding operations of the network device in the method embodiment. For brevity, details are not repeated herein.

Optionally, the processor 910 may invoke the program codes stored in the memory 920 to perform the corresponding operations of the terminal device in the method embodiment. For brevity, details are not repeated herein.

It should be understood that the processor in the embodiment of the present application may be an integrated circuit chip and has a signal processing capability. In the implementation process, each step of the foregoing method embodiment may be completed by using an integrated logic circuit of hardware in a processor or an instruction in a form of software. The above processor may be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the embodiments of the present application can be implemented or executed. The general-purpose processor may be a microprocessor or the processor may be any conventional processor or the like. The steps of the method disclosed in combination with the embodiments of the present application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in a memory, and the processor reads the information in the memory and completes the steps of the foregoing method in combination with its hardware.

It can be understood that the memory in the embodiment of the present application may be a volatile memory or a non-volatile memory, or may include both volatile and non-volatile memory. Among them, the non-volatile memory may be a read-only memory (ROM), a programmable ROM (PROM), an erasable PROM (EPROM), an electrically EPROM (EEPROM) or flash memory. The volatile memory may be a random access memory (RAM), which is used as an external cache. By way of example, but not limitation, many forms of RAM are available, such as static RAM (SRAM), dynamic random access memory (DRAM), synchronous DRAM (SDRAM), double data rate SDRAM (DDR SDRAM), enhanced SDRAM (ESDRAM), synchlink DRAM (SLDRAM) and direct Rambus RAM (DR RAM). It should be noted that the memory of the systems and methods described herein is intended to include, but is not limited to, these and any other suitable types of memory.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments described above are only schematic. For example, the division of the unit is only a logical function division. In actual implementation, there may be another division manner. For example, multiple units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may be or may not be physically separated, and the components displayed as units may be or may not be physical units, may be located in one place, or may be distributed on multiple network units. Some or all of the units may be selected according to actual needs to achieve the objective of the solution of this embodiment.

In addition, each functional unit in each embodiment of the present application may be integrated into one processing unit, or each of the units may exist separately physically, or two or more units may be integrated into one unit.

If the functions are implemented in the form of software functional units and sold or used as independent products, they can be stored in a computer-readable storage medium. Based on this understanding, a part of the technical solution of this application which essentially contributes to the prior art or any part of the technical solution can be embodied in the form of a software product. The computer software product is stored in a storage medium, including several instructions used for causing a computer device (which may be a personal computer, a server, or a network device, etc.) to perform all or part of the steps of the method described in each embodiment of the present application. The foregoing storage media may include: U disks, mobile hard disks, read-only memory (ROM), random access memory (RAM), magnetic disks or optical disks, and other media that can store program codes.

The above is only a specific implementation of this application, but the protection scope of this application is not limited thereto. Any person skilled in the art can easily think of changes or replacements within the technical scope disclosed in this application. It should be covered by the protection scope of this application. Therefore, the protection scope of this application shall be determined by the protection scope of the claims.

What is claimed is:

1. An apparatus in a wireless communication device, comprising:
    a processor and a memory storing program instructions; wherein when the program instructions are executed by the processor, the apparatus is configured to:
        determine whether a first time unit or a second time unit is a feedback timing corresponding to a first downlink channel transmitted through a first resource unit belonging to a first target resource set and a second target resource set;
        output, when the first time unit is not the feedback timing corresponding to the first downlink channel, first feedback information on the first time unit for responding to the first downlink channel, the first feedback information including placeholder information at an ACK/NACK bit corresponding to the first resource unit; and
        output, when the second time unit is the feedback timing corresponding to the first downlink channel, second feedback information on the second time unit for responding to the first downlink channel, the second feedback information including ACK/NACK values at the ACK/NACK bit corresponding to the first resource unit.

2. The apparatus according to claim 1, wherein the placeholder information is 0.

3. The apparatus according to claim 2, wherein each resource unit in the second target resource set corresponds to at least one bit in the second feedback information.

4. The apparatus according to claim 1, wherein the apparatus is further configured to:
    determine whether the first time unit is a feedback timing corresponding to a second downlink channel transmitted through a second resource unit of the first target resource set; and output, when the first time unit is the feedback timing corresponding to the second downlink channel, third feedback information on the first time unit for responding to the second downlink channel, the third feedback information including ACK/NACK values at an ACK/NACK bit corresponding to the second resource unit.

5. The apparatus according to claim 1, wherein the first target resource set is determined according to a high-level parameter.

6. The apparatus according to claim 1, wherein each resource unit in the first target resource set is configured for transmitting on the first downlink channel.

7. The apparatus according to claim 1, wherein the first target resource set includes at least one time unit within at least one carrier.

8. The apparatus according to claim 1, wherein a number of bits of the first feedback information is determined based on a number of resource units in the first target resource set.

9. The apparatus according to claim 1, wherein each resource unit in the first target resource set corresponds to at least one bit in the first feedback information.

10. The apparatus according to claim 1, wherein the apparatus is further configured to:
    input indication information, wherein the indication information is used for indicating that the feedback timing corresponding to the first downlink channel is a second time unit.

11. The apparatus according to claim 1, wherein the apparatus is contained in a terminal device.

12. A wireless communication method, implemented by an apparatus in a wireless communication device, comprising:
    determining whether a first time unit or a second time unit is a feedback timing corresponding to a first downlink channel transmitted through a first resource unit belonging to a first target resource set and a second target resource set;
    outputting, when the first time unit is not the feedback timing corresponding to the first downlink channel, first feedback information on the first time unit for responding to the first downlink channel, the first feedback information including placeholder information at an ACK/NACK bit corresponding to the first resource unit; and
    outputting, when the second time unit is the feedback timing corresponding to the first downlink channel, second feedback information on the second time unit for responding to the first downlink channel, the second feedback information including ACK/NACK values at the ACK/NACK bit corresponding to the first resource unit.

13. The method according to claim 12, wherein placeholder information is 0.

14. The method according to claim 13, wherein each resource unit in the second target resource set corresponds to at least one bit in the second feedback information.

15. The method according to claim 12, further comprising:
    determining whether the first time unit is a feedback timing corresponding to a second downlink channel transmitted through a second resource unit of the first target resource set; and
    outputting, when the first time unit is the feedback timing corresponding to the second downlink channel, third feedback information on the first time unit for responding to the second downlink channel, the third feedback information including ACK/NACK values at an ACK/NACK bit corresponding to the second resource unit.

16. The method according to claim 12, wherein the first target resource set is determined according to a high-level parameter.

17. The method according to claim 12, wherein each resource unit in the first target resource set is configured for transmitting on the first downlink channel.

18. The method according to claim 12, wherein the first target resource set includes at least one time unit within at least one carrier.

19. The method according to claim 12, wherein a number of bits of the first feedback information is determined based on a number of resource units in the first target resource set.

20. The method according to claim 12, wherein each resource unit in the first target resource set corresponds to at least one bit in the first feedback information.

21. The method according to claim 12, further comprising:
   inputting indication information, wherein the indication information is used for indicating that the feedback timing corresponding to the first downlink channel is a second time unit.

22. The method according to claim 12, wherein the apparatus is contained in a terminal device.

* * * * *